(12) United States Patent
Tanaka

(10) Patent No.: US 11,952,244 B2
(45) Date of Patent: Apr. 9, 2024

(54) CRANE AND METHOD FOR DETERMINING WEIGHT STATE IN CRANE

(71) Applicant: KOBELCO CONSTRUCTION MACHINERY CO., LTD., Hiroshima (JP)

(72) Inventor: Yasuhiro Tanaka, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 960 days.

(21) Appl. No.: 16/910,257

(22) Filed: Jun. 24, 2020

(65) Prior Publication Data

US 2020/0407198 A1 Dec. 31, 2020

(30) Foreign Application Priority Data

Jun. 26, 2019 (JP) ................................ 2019-118852

(51) Int. Cl.
*B66C 13/16* (2006.01)
*B66C 15/06* (2006.01)
*B66C 23/74* (2006.01)
*G06K 7/10* (2006.01)
*H04B 17/20* (2015.01)

(52) U.S. Cl.
CPC ............. *B66C 13/16* (2013.01); *B66C 15/06* (2013.01); *B66C 23/74* (2013.01); *G06K 7/10366* (2013.01); *H04B 17/20* (2015.01)

(58) Field of Classification Search
CPC ......... B66C 13/16; B66C 15/06; B66C 23/74; H04B 17/20; G06K 7/10366
See application file for complete search history.

(56) References Cited

U.S. PATENT DOCUMENTS

2017/0022035 A1 1/2017 Iwazawa
2018/0179030 A1 6/2018 Nysse et al.

FOREIGN PATENT DOCUMENTS

JP 08-188383 A 7/1996
JP 2017-226537 A 12/2017
WO WO 2016/201294 A1 12/2016

OTHER PUBLICATIONS

Extended European Search Report dated Nov. 24, 2020 in European Patent Application No. 20181556.0, 10 pages.

*Primary Examiner* — Michael D Lang
(74) *Attorney, Agent, or Firm* — Oblon, McClelland, Maier & Neustadt, L.L.P.

(57) ABSTRACT

A tag reader acquires identification data and data of a reception intensity indicative of an intensity of a reception signal from a weight tag mounted on each weight, and a data processing device acquires the identification data and the data of a reception intensity of each weight tag from the tag reader, discriminates the identification data corresponding to each weight tag into attached weight data indicating that a reception intensity corresponding to the identification data exceeds a reference intensity set in advance and other non-attached weight data, and determines an attachment state of the weight to the main body portion based on the attached weight data.

13 Claims, 7 Drawing Sheets

CRANE AND METHOD FOR DETERMINING WEIGHT STATE IN CRANE

FIELD OF THE INVENTION

The present invention relates to a crane capable of determining a weight attachment state, and a method for determining a weight state in the crane.

BACKGROUND ART

A crane is provided with a main body portion including a lower travelling body and an upper slewing body, and a boom coupled to the upper slewing body so as to be capable of going up and down. The boom supports a hanging rope from which a hoisted load is hung.

There is also a case where one or more weights for enhancing stability of the main body portion are attached to the main body portion according to a work condition at a work site. Specifically, there are a case where one or more counter weights are attached to the upper slewing body and a case where one or more body weights are attached to the lower travelling body.

Further, the crane is provided with an overload prevention device. The overload prevention device restricts operation of the boom and operation of hoisting up or drawing out the hanging rope based on crane configuration information including a length of the boom and information about an attachment state of the weight, and on a weight of the hoisted load.

There is a case where information about an attachment state of the weight is input by person's operation of an input device such as an operation panel. In this case, erroneous input of information is liable to occur.

There is also a case where with a plurality of electronic parts for detecting the number of the weights provided in each of the weights and the main body portions, the plurality of electronic parts are connected via a signal line when the weight is attached to the main body portion. In this case, work at an elevated site is required for connecting the signal line, which is not desirable for safety's sake.

It is a known technique to detect an attachment state of the weight based on data acquired by a tag reader provided in the crane, the tag reader acquiring data recorded in an electronic tag mounted on each weight by radio communication (e.g. Japanese Unexamined Patent Publication No. 8-188383).

There is, however, a case where the weight yet to be attached to the main body portion is placed on a work site of the crane. In this case, the tag reader provided in the main body portion will acquire date from the electronic tag mounted on the weight yet to be attached.

If the number of all the electronic tags from which the tag reader could acquire data is counted as the number of the weights attached, an attachment state of the weight might be erroneously determined.

SUMMARY OF THE INVENTION

An object of the present invention is to provide a crane capable of automatically and correctly determining an attachment state of a weight even when a weight yet to be attached is present at a work site, and a weight state determination method thereof.

A crane according to one aspect of the present invention includes a main body portion which includes a lower travelling body and an upper slewing body turnably provided on the lower travelling body and to which a plurality of weights can be attached; a tag reader which is provided in the main body portion and acquires, from a weight tag mounted on each weight, identification data corresponding to each weight tag by radio communication; and a data processing device which acquires data from the tag reader, in which the data processing device includes: a data acquisition portion which acquires the identification data and reception intensity data corresponding to each weight tag from the tag reader, the reception intensity data being indicative of a reception intensity of a signal in the radio communication between each weight tag and the tag reader; a data discrimination portion which discriminates the identification data corresponding to each weight tag into first identification data indicating that a reception intensity indicated by reception intensity data corresponding to the identification data exceeds a reference intensity set in advance for determining whether each weight is attached to the main body portion or not and other second identification data; and an attachment determination portion which determines an attachment state of each weight to the main body portion based on the first identification data only.

A method for determining a weight state in a crane according to another aspect of the present invention is a method for determining a weight state in a crane, the crane including a main body portion which includes a lower travelling body and an upper slewing body turnably provided on the lower travelling body and to which a plurality of weights can be attached; a tag reader which is provided in the main body portion and acquires, from a weight tag mounted on each weight, identification data corresponding to each weight tag by radio communication; and a data processing device which acquires data from the tag reader, the method including: the step of executing processing, by the tag reader, of acquiring the identification data and reception intensity data from each weight tag by the radio communication, the reception intensity data being indicative of a reception intensity of a signal in the radio communication between each weight tag and the tag reader; the step of acquiring the identification data and the reception intensity data corresponding to each weight tag from the tag reader by the data processing device; the step of discriminating, by the data processing device, the identification data corresponding to each weight tag into first identification data indicating that a reception intensity indicated by reception intensity data corresponding to the identification data exceeds a reference intensity set in advance for determining whether each weight is attached to the main body portion or not and other second identification data; and the step of determining an attachment state of each weight to the main body portion based on the first identification data only by the data processing device.

DESCRIPTION OF EMBODIMENTS

In the following, embodiments of the present invention will be described with reference to the drawings. Each of the embodiments below is one example of implementation of the present invention and does not limit a technical range of the present invention.

First Embodiment: Configuration of Crane 10

A crane 10 according to a first embodiment is a mobile crane which moves a hoisted load while hoisting up the hoisted load.

Figure 1:
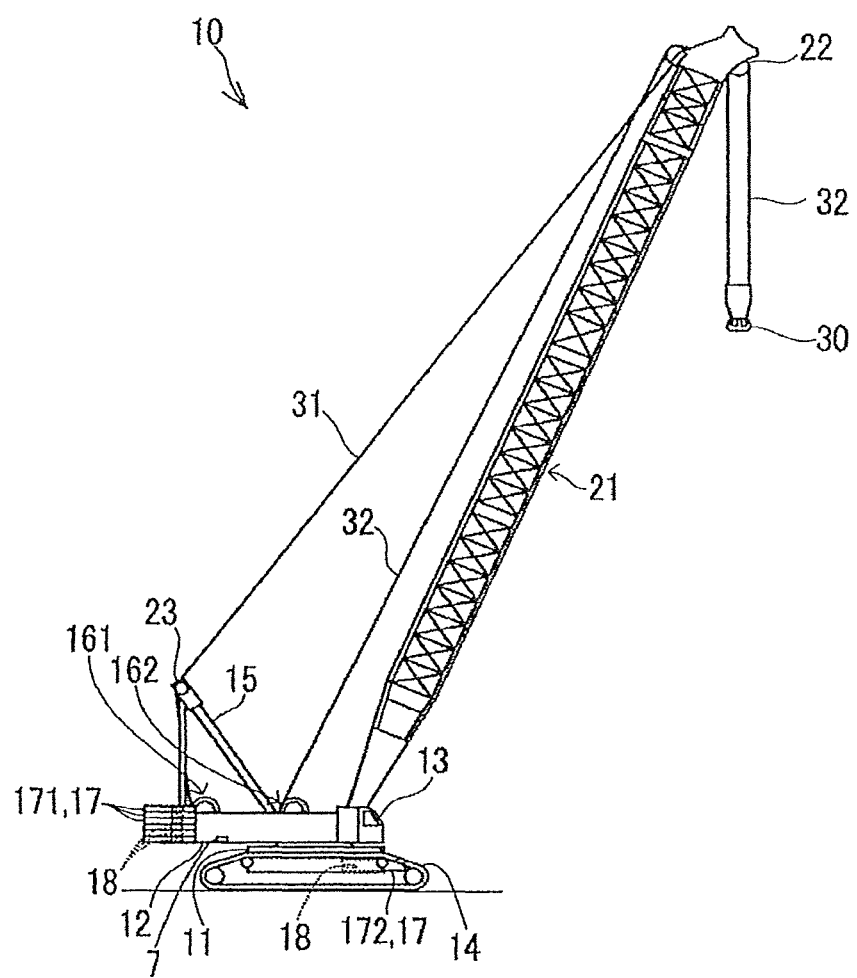
FIG. 1 is a configuration view of a crane according to a first embodiment.

As shown in FIG. 1, the crane 10 includes, a lower travelling body 11, an upper slewing body 12, a cab 13, a travelling device 14, a gantry 15, a first winch device 161, a second winch device 162, a boom 21, a hook 30, an up and down rope 31, and a hanging rope 32.

The cab 13, the gantry 15, the first winch device 161, and the second winch device 162 are supported by the upper slewing body 12. The cab 13 is configured integrally with the upper slewing body 12. The boom 21 is coupled to the upper slewing body 12 so as to be capable of going up and down.

The upper slewing body 12 is turnably provided on the lower travelling body 11. The lower travelling body 11 is a pedestal part turnably supporting the upper slewing body 12. The upper slewing body 12 is driven to turn by a driving source not shown.

When the upper slewing body 12 turns, the cab 13, the gantry 15, the first winch device 161, the second winch device 162, and the boom 21 also turn together with the upper slewing body 12.

The travelling device 14 is configured integrally with the lower travelling body 11. The travelling device 14 supports the lower travelling body 11 and is capable of travelling. FIG. 1 shows an example where the travelling device 14 is a crawler type device. The travelling device 14 may be a device travelling on wheels.

The up and down rope 31 is stretched from a front end portion of the boom 21 to the first winch device 161 via a gantry sheave 23 provided in the gantry 15. The first winch device 161 supports the boom 21 via the up and down rope 31.

The hanging rope 32 is stretched from the hook 30 to the second winch device 162 via a boom point idler sheave 22 provided at the front end portion of the boom 21. The second winch device 162 supports the hook 30 and a hoisted load hung by the hook 30 via the hanging rope 32.

The first winch device 161 causes the boom 21 to go up and down by taking up or drawing out the up and down rope 31. The second winch device 162 causes the hook 30 to rise and lower by taking up or drawing out the hanging rope 32.

Here, the lower travelling body 11 and the upper slewing body 12 will be referred to as a main body portion of the crane 10. There is a case where one or a plurality of weights 17 for enhancing stability of the main body portion are attached to the main body portion according to a work condition at a work site. The weight 17 is attached to the main body portion for enhancing stability of the main body portion.

The weight 17 includes one or more counter weights 171 detachably attached to the upper slewing body 12. There is a further case where the weight 17 includes one or more body weights 172 detachably attached to the lower travelling body 11.

Figure 2:
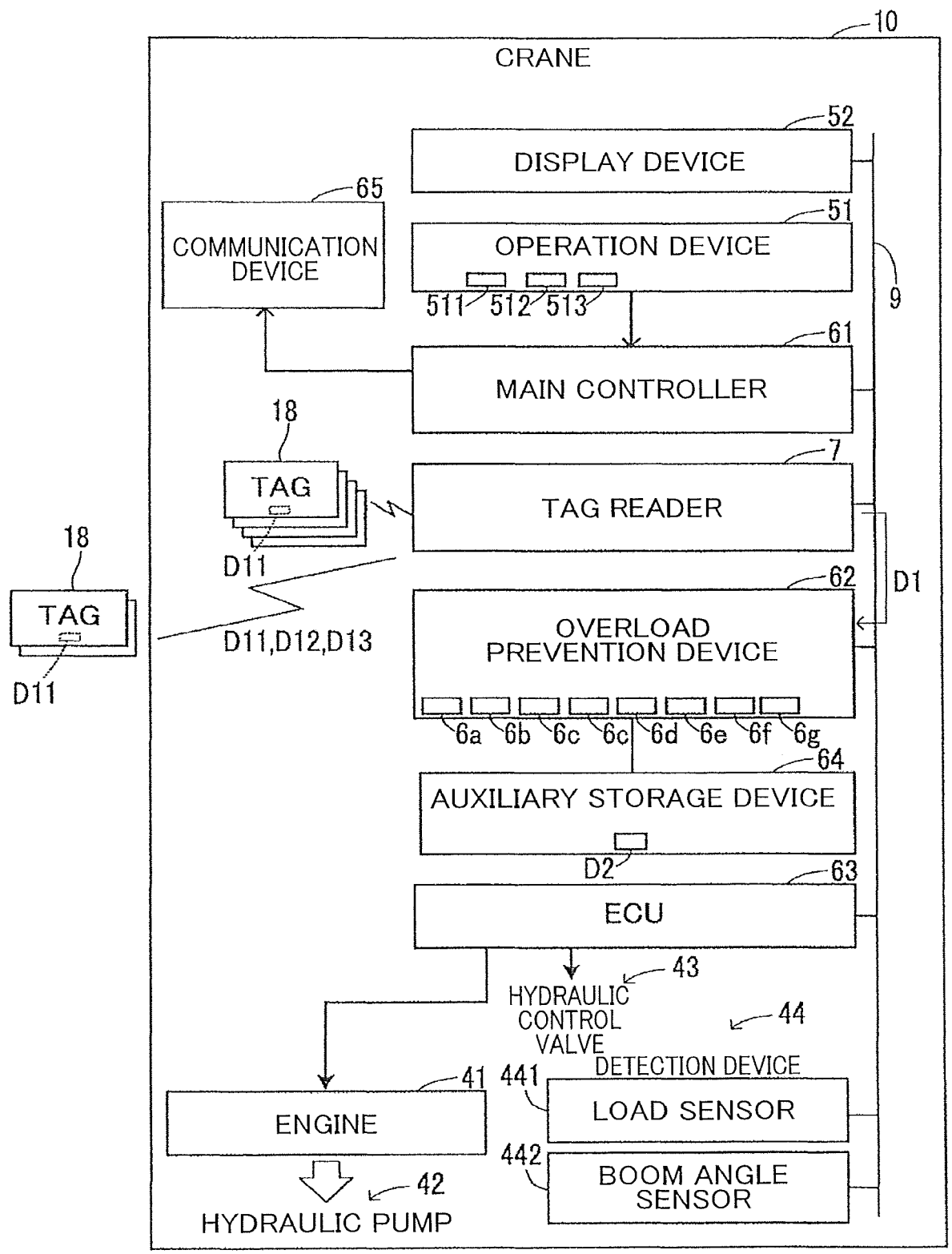
FIG. 2 is a block diagram showing a configuration of a control related apparatus in the crane according to the first embodiment.

As shown in FIG. 2, the crane 10 is provided with driving system apparatuses such as an engine 41, a hydraulic pump 42, and a hydraulic control valve 43. The crane 10 is further provided with control system apparatuses such as a main controller 61, an overload prevention device 62, an ECU (Engine Control Unit) 63, and an auxiliary storage device 64.

The crane 10 further includes devices for human interface such as an operation device 51 and a display device 52 provided in the cab 13, and a detection device 44 for detecting a state of the crane 10. The detection device 44 includes various kinds of sensors.

The operation device 51 is a device which accepts operator's operation. The display device 52 is a device indicative of information. The operation device 51 includes an operation lever 511, an operation button 512, and an input device 513.

The input device 513 accepts input of information by the operator. The input device 513 is, for example, a touch panel configured integrally with the display device 52. Additionally, the input device 513 may be a device which accepts input of information by voice operation by the operator.

The detection device 44 includes a load sensor 441, a boom angle sensor 442, and the like. The load sensor 441 detects a weight of the hoisted load. The boom angle sensor 442 detects an up and down angle of the boom 21.

The main controller 61, the ECU 63, the overload prevention device 62, the detection device 44, and the display device 52 are communicable with each other through an onboard network 9 such as a CAN (Controller Area Network).

Detection results of the various detection devices 44 are transmitted to the main controller 61, the ECU 63, and the overload prevention device 62 through the onboard network 9.

The engine 41 drives the hydraulic pump 42. The hydraulic control valve 43 supplies a compressed oil to a target drive portion such as a hydraulic motor not shown according to a control signal from the ECU 63 or the main controller 61. The drive portion drives a drive target such as a winch device 16 or the upper slewing body 12.

The main controller 61 controls a control target such as the hydraulic control valve 43 according to operation of the operation device 51 or detection results of various detection devices 44.

The ECU 63 controls a part of the engine 41 and the hydraulic control valve 43 according to detection results of various detection devices 44 or following a control command from the main controller 61. The auxiliary storage device 64 is a computer-readable non-volatile storage device. For example, an SSD (Solid State Drive) or an EEPROM (Electrically Erasable Programmable Read-Only Memory), or the like is adopted as the auxiliary storage device 64.

The overload prevention device 62 restricts operation of the boom 21 and operation of taking up or drawing out the up and down rope 31 based on crane configuration information including information about a length of the boom 21 and an attachment state of the weight 17, and detection results of the load sensor 441.

Figure 3:
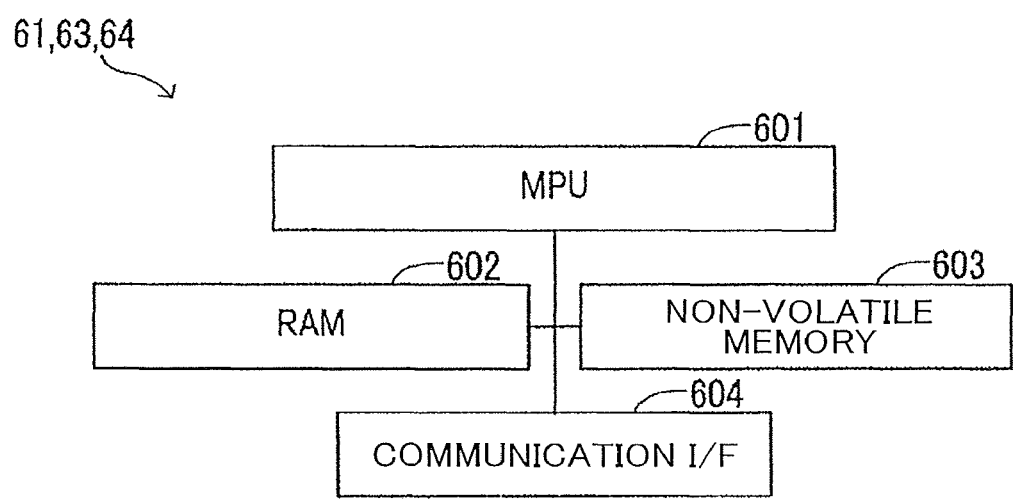
FIG. 3 is a block diagram showing a configuration of a main controller, an overload prevention device, and an ECU in the crane according to the first embodiment.

As shown in FIG. 3, the main controller 61, the ECU 63, and the overload prevention device 62 are each provided with an MPU (Miro Processing Unit) 601, a RAM (Random Access Memory) 602, a non-volatile memory 603, a communication interface 604, and the like. The RAM 602 and the non-volatile memory 603 are computer-readable storage devices.

The MPU 601 is one example of a processor which executes various kinds of data processing and control by executing a program stored in the non-volatile memory 603 in advance.

The RAM 602 is a volatile memory which temporarily stores the program to be executed by the MPU 601 and data to be derived or referred to by the MPU 601.

The non-volatile memory 603 stores the program to be executed by the MPU 601 and data to be referred to by the MPU 601. For example, the non-volatile memory 603 is an EEPROM, a flash memory, or the like.

The communication interface 604 is a device which controls data communication between the MPU 601 of the device itself and other device through the onboard network 9.

For the crane 10, a plurality of the weights 17 are prepared. A part of or the plurality of weights 17 are attached to the main body portion.

A plurality of weight tags 18 are mounted on the plurality of weights 17, respectively, the weight tags being electronic tags on which the identification data D11 is recorded in advance. For example, the identification data D11 is data by which one or a plurality of a model of the crane 10, a kind of the weight 17, and a weight of a single weight 17 can be identified. Here, a kind of the weight 17 is the counter weight 171 or the body weight 172.

Then, the crane 10 further includes a tag reader 7 provided in the main body portion. In the example shown in FIG. 1, the tag reader 7 is arranged in the upper slewing body 12. This enables the tag reader 7 to communicate with the overload prevention device 62 through the wired onboard network 9.

The tag reader 7 acquires the identification data D11 from each weight tag 18 by radio communication under circumstances where the plurality of weights 17 are present around the tag reader. Here, the circumference of the tag reader 7 is a region including a position away from the main body portion at a work site of the crane 10.

The tag reader 7 acquires the identification data D11 from each weight tag 18 by conducting radio communication, for example, Bluetooth or LPWA (Low Power Wide Area) communication with each weight tag 18. The LPWA communication is communication in conformity with, for example, a communication standard such as LoRaWAN or SIGFOX.

The overload prevention device 62 is capable of acquiring the identification data D11 and the like from the tag reader 7 through the onboard network 9. The overload prevention device 62 is one example of a data processing device. The overload prevention device 62 determines an attachment state of the weight 17 in the main body portion based on the identification data D11 acquired from the tag reader 7.

The crane 10 is further provided with a communication device 65 which conducts communication with an external management device not shown through network lines including a radio communication network. The overload prevention device 62 is capable of transmitting data indicative of a situation of the crane 10 to the management device through the main controller 61 and the communication device 65. The overload prevention device 62 may be connected with the communication device 65. In this case, the overload prevention device 62 transmits data indicative of a situation of the crane 10 to the management device through the communication device 65.

There is, however, a case where the weight 17 yet to be attached to the main body portion is placed at the work site of the crane 10. In this case, the tag reader 7 provided in the main body portion will acquire data from the weight tag 18 mounted on the weight 17 yet to be attached.

If the number of all weight tags 18 from which the tag reader 7 could acquire the identification data D11 is counted as the number of the weights 17 attached, an attachment state of the weight 17 might be erroneously determined.

Meanwhile, in the crane 10, the overload prevention device 62 executes weight state determination processing to be described later (see FIG. 5). This allows the overload prevention device 62 to automatically and correctly determine an attachment state of the weight 17 even when the weight 17 yet to be attached is present at the work site.

[Configuration of Tag Reader 7]

Figure 4:
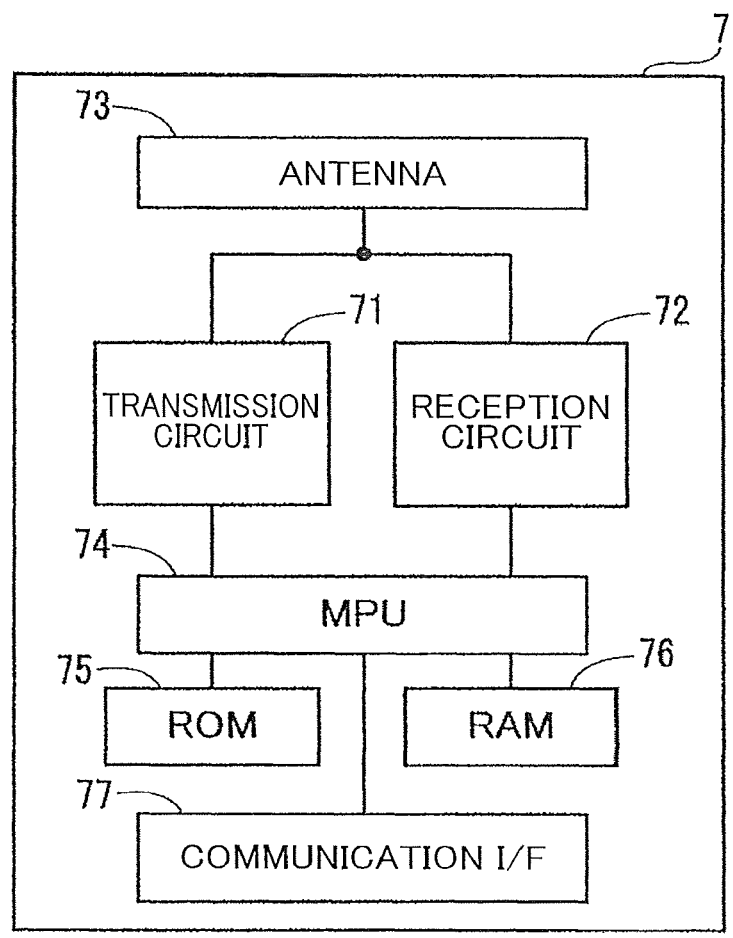
FIG. 4 is a block diagram showing a configuration of a tag reader in the crane according to the first embodiment.

Here, with reference to FIG. 4, a configuration of the tag reader 7 will be described. As shown in FIG. 4, the tag reader 7 is provided with a transmission circuit 71, a reception circuit 72, an antenna 73, an MPU 74, a ROM 75, a RAM 76, and a communication interface 77.

The transmission circuit 71 transmits a data request signal to the weight tag 18 according to a command of the MPU 74. The transmission circuit 71 transmits the data request signal through the antenna 73.

The reception circuit 72 receives a data carrier signal as a response signal to the data request signal and subjects the data carrier signal to demodulation processing to specify data included in the data carrier signal.

In the present embodiment, data included in the data carrier signal are the identification data D11, remaining battery life data D12, and reception intensity data D13. The remaining battery life data D12 is data indicative of a remaining buttery life that each weight tag 18 has.

The reception intensity data D13 is data of a reception intensity indicative of an intensity of the data request signal in each weight tag 18. Each weight tag 18 is provided with a circuit which detects an intensity of the data request signal from the tag reader 7. The data request signal is one example of a reception signal received by each weight tag 18 from the tag reader 7 through radio communication. Commonly, the longer a distance from the tag reader 7 to the weight tag 18 becomes, the lower becomes the reception intensity in the weight tag 18.

The reception circuit 72 receives the data carrier signal through the antenna 73 to transmit tag data D1 including the identification data D11, the remaining battery life data D12, and the reception intensity data D13 to the MPU 74.

The MPU 74 causes the transmission circuit 71 to transmit the data request signal according to a command from the overload prevention device 62 and further transmit the tag data D1 acquired from the reception circuit 72 to the overload prevention device 62.

The MPU 74 executes processing related to acquisition of data from an electronic tag such as the weight tag 18, acquisition of a command from the overload prevention device 62, and output of data to the overload prevention device 62 by executing a computer program stored in the ROM 75 in advance.

The RAM 76 temporarily stores a program to be executed by the MPU 74 and data to be referred to or output by the MPU 74.

The communication interface 77 is a device which controls data communication through the onboard network 9 between the MPU 74 and other device.

[Weight State Determination Processing]

Next, with reference to the flow chart shown in FIG. 5, description will be made of one example of a procedure of the weight state determination processing.

The overload prevention device 62 includes a plurality of processing modules realized by executing, by the MPU 601, a computer program determined in advance. The plurality of these processing modules execute the weight state determination processing. The plurality of processing modules include a data acquisition portion 6a, a reference setting portion 6b, a data discrimination portion 6c, an attachment determination portion 6d, a battery determination portion 6e, a notification portion 6f, and a restriction portion 6g.

In the following description, S101 to S108 represent identification codes indicative of a plurality of steps executed by the overload prevention device 62 in the weight state determination processing. S201 to S203 represent identification codes indicative of a plurality of steps executed by the tag reader 7 in the weight state determination processing.

For example, when weight determination start operation determined in advance is conducted with respect to the input device 513, the data acquisition portion 6a starts the weight state determination processing. First, description will be made of steps executed by the overload prevention device 62 in the weight state determination processing.

<Step S101>

In the weight state determination processing, first, the data acquisition portion 6a outputs a read command to the tag reader 7. The read command is a command for causing the tag reader 7 to start processing of acquiring data from the weight tag 18.

<Step S102>

Next, the data acquisition portion 6a acquires the tag data D1 from the tag reader 7. As described above, the tag data D1 includes the identification data D11, the remaining battery life data D12, and the reception intensity data D13.

<Step S103>

Next, the reference setting portion 6b sets a reference intensity as a target to be compared with the reception intensity data D13 in the later Step S105. The reference setting portion 6b which executes processing of Step S103 is one example of a first reference setting portion.

In Step S103, among the plurality of reception intensity data D13 obtained in Step S102, the reference setting portion 6b sets the reference intensity with a reception intensity indicated by the reception intensity data D13 as a reference, the reception intensity data being corresponding to the identification data D11 coincident with specific identification data D2 determined in advance. The reference intensity is used for determining whether each weight 17 is attached to the main body portion or not.

The specific identification data D2 is recorded in advance in the weight tag 18 mounted on a base weight which is one of the plurality of counter weights 171. The base weight is one that is attached to the upper slewing body 12 without fail among the plurality of counter weights 171 which can be attached to the upper slewing body 12.

In other words, the reference setting portion 6b sets the reference intensity with the reception intensity corresponding to the weight tag 18 mounted on the base weight as a reference. As a result, the reference intensity is set with an intensity of the data carrier signal as a reference, the data carrier signal being used in a case where the tag reader 7 conducts radio communication with the weight tag 18 arranged at an attachment position of the base weight.

For example, the reference setting portion 6b derives the reference intensity by multiplying the reception intensity data D13 corresponding to the identification data D11 coincident with the specific identification data D2 by a coefficient which is determined in advance and larger than 1.

In a case where all the plurality of identification data D11 fail to coincide with the specific identification data D2, the reference setting portion 6b executes error notification processing determined in advance and then finishes the weight state determination processing.

Further, also in a case where the reception intensity data D13 corresponding to the identification data D11 coincident with the specific identification data D2 is below a lower limit value determined in advance, the reference setting portion 6b executes the error notification processing and then finishes the weight state determination processing. Recitation regarding the error notification processing is omitted from FIG. 5.

<Step S104>

Next, the data discrimination portion 6c discriminates the plurality of identification data D11 obtained in Step S102 into attached weight data (one example of first identification data) corresponding to the reception intensity data D13 exceeding the reference intensity set in Step S103 and other non-attached weight data (one example of second identification data).

The attached weight data is the identification data D11 corresponding to the weight 17 determined to have been already attached to the main body portion. The non-attached weight data is the identification data D11 corresponding to the weight 17 determined to be present at the work site but determined not to have been attached to the main body portion.

<Step S105>

Next, the attachment determination portion 6d determines a state of attachment of the weight 17 to the main body portion based on the attached weight data.

In a case where the identification data D11 is data by which a kind of the weight 17 can be identified, the attachment determination portion 6d determines a weight of the counter weight 171 attached to the upper slewing body 12 and a weight of the body weight 172 attached to the lower travelling body 11 as the attachment states.

Specifically, the attachment determination portion 6d determines a weight of the counter weight 171 attached to the upper slewing body 12 by multiplying the number of the attached weight data indicating that a kind of weight is the counter weight 171 by an already known weight of the single counter weight 171 stored in the auxiliary storage device 64 in advance.

Similarly, the attachment determination portion 6d determines a weight of the body weight 172 attached to the lower travelling body 11 by multiplying the number of the attached weight data indicating that a kind of weight is the body weight 172 by an already known weight of the single body weight 172 stored in the auxiliary storage device 64 in advance.

Additionally, in a case where the identification data D11 is data by which a weight 17 of the single weight can be identified, the attachment determination portion 6d determines a weight of the counter weight 171 or the body weight 172 by totaling the single weights corresponding to the attached weight data.

<Step S106>

Next, the notification portion 6f notifies information indicative of a determination result of an attachment state of the weight 17 to the main body portion. Specifically, the notification portion 6f notifies an operator of the information by causing the display device 52 to display the determination result.

By causing the display device 52 to display a determination result of an attachment state, the attachment determination portion 6d urges the operator to check whether the attachment state determination result is correct or not. Further, when fixing operation determined in advance is conducted with respect to the input device 513, the attachment determination portion 6d fixes the attachment state determination result.

By contrast, when modification operation is conducted with respect to the input device 513, the attachment determination portion 6d fixes the attachment state determination result after modifying the same.

The restriction portion 6g restricts operation of the boom 21 and operation of taking up or drawing out the up and down rope 31 based on the crane configuration information including the attachment state determination result obtained from the attachment determination portion 6d.

In Step S106, the notification portion 6f may possibly notify the management device of information indicative of the attachment state determination result and information of the non-attached weight data through the communication device 65. This enables a manager to seize a use situation of the weight 17 at a work site in detail.

<Step S107>

Next, the battery determination portion 6e determines whether a part or all of the remaining battery life data D12 obtained in Step S102 indicates a low remaining battery life or not.

Then, when determining that a part or all of the remaining battery life data D12 indicates the low remaining battery life, the battery determination portion 6e causes the notification portion 6f to execute processing of Step S108 and otherwise finishes the weight state determination processing.

<Step S108>

In Step S108, the notification portion 6f executes low remaining battery life notifying processing which is processing of notifying that a weight tag 18 having a low remaining battery life is present. Thereafter, the notification portion 6f finishes the weight state determination processing.

For example, the notification portion 6f notifies the operator of battery information including the remaining battery life data D12 indicative of the low remaining battery life and the identification data D11 corresponding to the remaining battery life data D12 by causing the display device 52 to display these information.

The notification portion 6f also may possibly notify the management device of the battery information through the communication device 65.

Next, description will be made of steps to be executed by the tag reader 7 in the weight state determination processing.

<Step S201>

First, the tag reader 7 waits for reception of the read command from the overload prevention device 62. Then, upon receiving the read command, the tag reader 7 executes processing of Step S202.

<Step S202>

In Step S202, the tag reader 7 acquires the identification data D11, the remaining battery life data D12, and the reception intensity data D13 from each of all the weight tags 18 within a range of the radio communication through the radio communication. Further, the tag reader 7 executes processing of Step S203.

<Step S203>

In Step S203, the tag reader 7 outputs the tag data D1 including the identification data D11, the remaining battery life data D12, and the reception intensity data D13 acquired from each weight tag 18 to the overload prevention device 62. Thereafter, the tag reader 7 repeats the processing starting from Step S201.

As described in the foregoing, the overload prevention device 62 does not use the identification data D11 for the determination of an attachment state of the weight 17 based on the reception intensity data D13, the identification data D11 being transmitted from the weight tag 18 present at a position away from the main body portion and being received by the tag reader 7.

Accordingly, even when the weight yet to be attached 17 is present at the work site, the overload prevention device 62 is allowed to automatically and correctly determine an attachment state of the weight 17.

Since the crane 10 is operated outdoors, a communication environment largely varies with a place of a work site and weather. It is therefore considered to set intensities of transmission signals in the weight tag 18 and the tag reader 7 such that a maximum communication distance to each of the tag reader 7 and the weight tag 18 under a standard environment determined in advance is from several tens of meters to approximately 100 meters.

Figure 5:
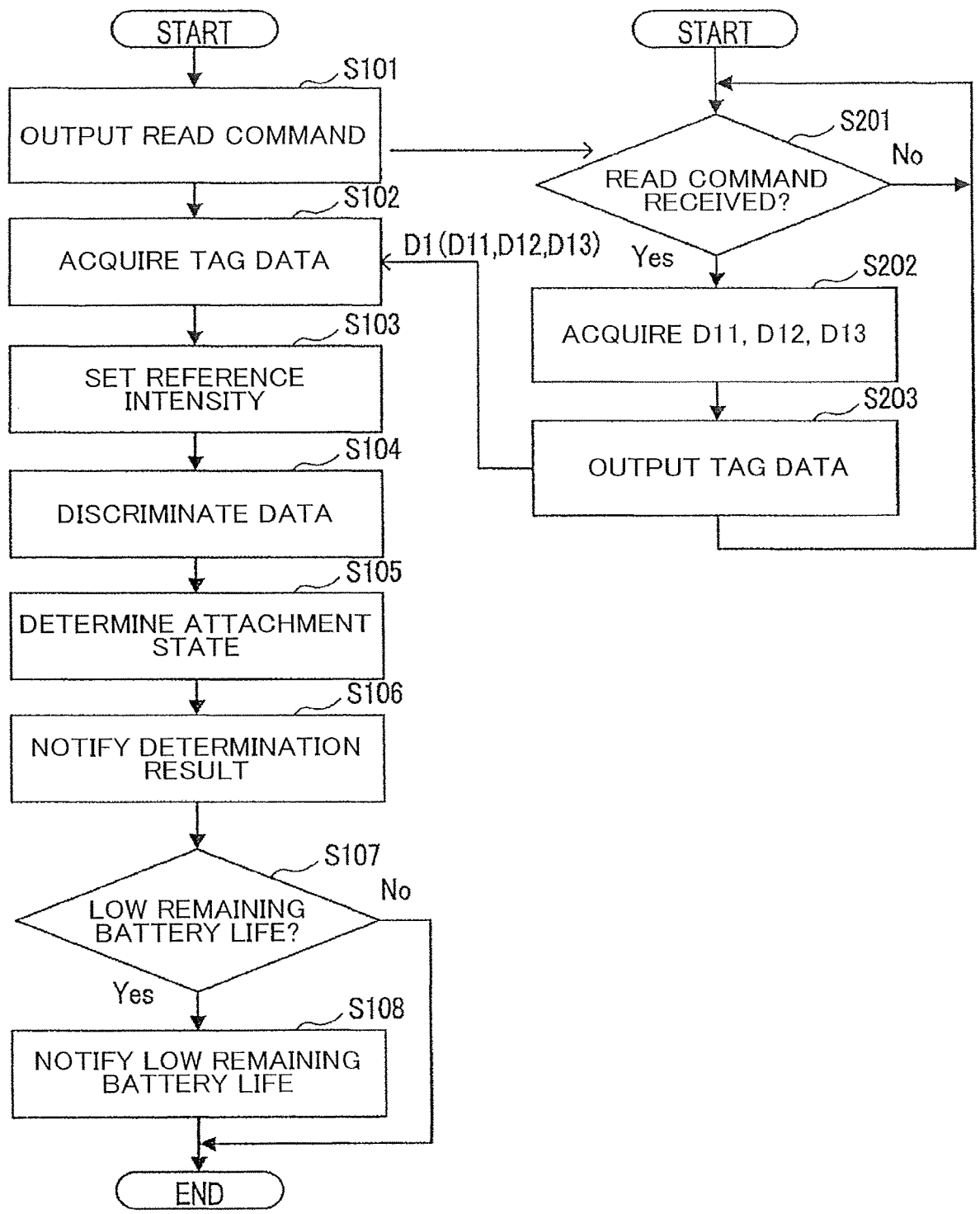
FIG. 5 is a flow chart showing one example of a procedure of weight state determination processing in the crane according to the first embodiment.

In the present embodiment, the reference intensity is set based on the reception intensity data D13 corresponding to the base weight (see Step S103 in FIG. 5). As a result, even when an intensity of a reception signal in the tag reader 7 varies with the communication environment other than a communication distance, the reference intensity is set which is less likely to be affected by the communication environment.

Second Embodiment

Figure 6:
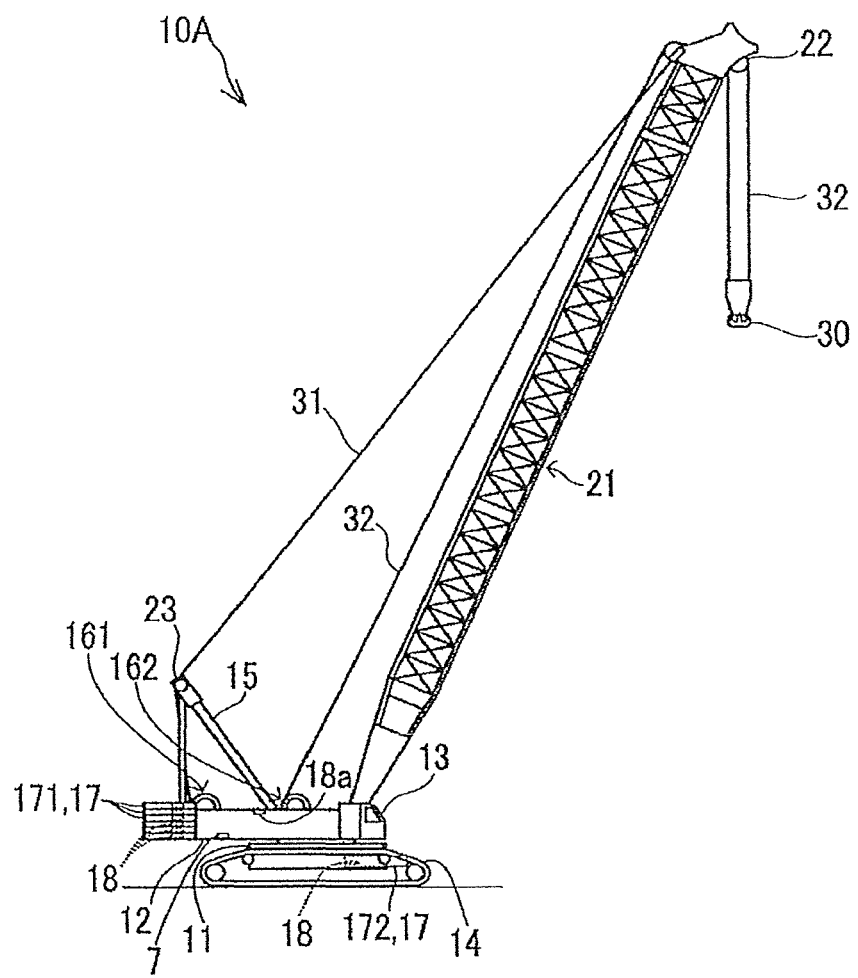
FIG. 6 is a configuration view of a crane according to a second embodiment.

Next, a crane 10A according to a second embodiment will be described with reference to FIG. 6. In FIG. 6, the same components as the components shown in FIG. 1 and FIG. 2 are given the same reference codes. In the following, description will be made of points of the crane 10A which are different from those of the crane 10.

The crane 10A has a configuration made of the crane 10 with a main body tag 18a additionally included. The main body tag 18a is an electronic tag which is provided in the main body portion and in which specific identification data D2 is recorded in advance. In the example shown in FIG. 6, the main body tag 18a is provided in an upper slewing body 12.

In the present embodiment, a tag reader 7 further executes, in Step S202 of FIG. 5, processing of acquiring the specific identification data D2 and reception intensity data D13 from the main body tag 18a by radio communication.

A data acquisition portion 6a of the crane 10A further acquires the specific identification data D2 and the reception intensity data D13 corresponding to the main body tag 18a from the tag reader 7 in Step S102 in FIG. 5.

Then, in Step S103 of FIG. 5, a reference setting portion 6b of the crane 10A sets the reference intensity with the reception intensity data D13 corresponding to the specific identification data D2 acquired from the tag reader 7 as a reference. A method of deriving the reference intensity is the same as the deriving method in the crane 10. The reference setting portion 6*b* in the present embodiment is one example of a second reference setting portion.

Also in a case where the crane 10A is adopted, the same effect as obtained when the crane 10 is adopted can be achieved.

Third Embodiment

Figure 7:
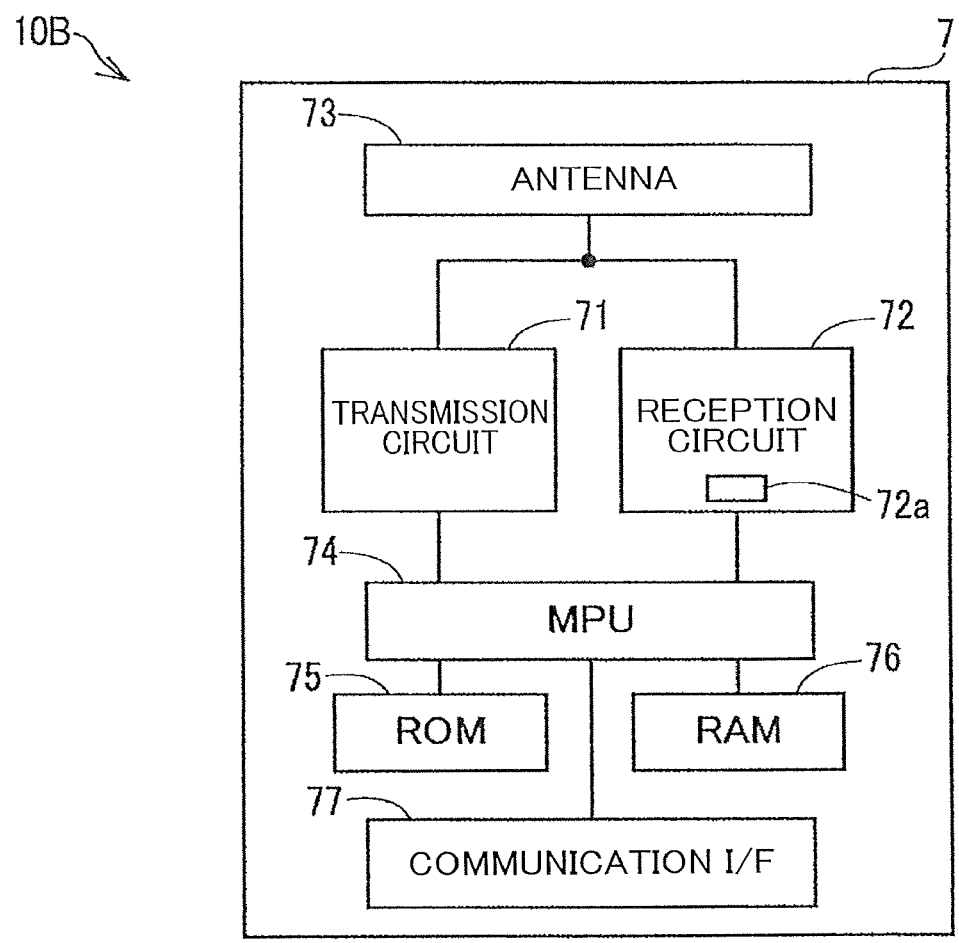
FIG. 7 is a block diagram showing a configuration of a tag reader in a crane according to a third embodiment.

In the following, with reference to FIG. 7, description will be made of a crane 10B according to a third embodiment, which is an application example of the cranes 10 and 10A. FIG. 7 is a block diagram showing a configuration of a tag reader 7 provided in in the crane 10B.

In the crane 10B, a reception circuit 72 of the tag reader 7 includes a reception intensity detection portion 72*a*. The reception intensity detection portion 72*a* is a circuit which detects an intensity of the data carrier signal from each weight tag 18. The data carrier signal is one example of a signal transmitted from each weight tag 18 by radio communication. Commonly, the longer a distance from the tag reader 7 to the weight tag 18 becomes, the lower becomes the intensity of the data carrier signal.

The reception intensity detection portion 72*a* may execute processing of detecting a reception intensity of a data carrier signal received by the reception circuit 72 from a main body tag 18*a*. The data carrier signal received from the main body tag 18*a* includes specific identification data which is identification data of the main body tag 18*a*. In the present application example, a reference setting portion 6*b* need only set a reference intensity from a reception intensity indicated by reception intensity data corresponding to the main body tag 18*a* detected by the reception intensity detection portion 72*a*.

In the present embodiment, the reception circuit 72 receives the data carrier signal from an antenna 73 and transmits tag data D1 including identification data D11, remaining battery life data D12, and detection data of the reception intensity detection portion 72*a* to an MPU 74.

Further, the MPU 74 transmits the tag data D1 including detection data of the reception intensity detection portion 72*a* to an overload prevention device 62. In the present application example, detection data of the reception intensity detection portion 72*a* is used in place of reception intensity data D13. In the present application example, accordingly, the reception intensity data D13 can be excluded from data included in the data carrier signal.

In other words, the overload prevention device 62 in the present application example executes the same processing as those of the cranes 10 and 10A, with detection data of the reception intensity detection portion 72*a* used as the reception intensity data D13. Also in a case where the crane 10B is adopted, the same effect can be achieved as those obtained in a case where the cranes 10 and 10A are adopted.

(Summary of Present Embodiments)

The technical features of the present embodiment are summarized as shown below.

The crane of the present embodiment includes a main body portion which includes a lower travelling body and an upper slowing body turnably provided on the lower travelling body and to which a plurality of weights can be attached; a tag reader which is provided in the main body portion and acquires, from a weight tag mounted on each weight, identification data corresponding to each weight tag by radio communication; and a data processing device which acquires data from the tag reader, in which the data processing device includes: a data acquisition portion which acquires the identification data and reception intensity data corresponding to each weight tag from the tag reader, the reception intensity data being indicative of a reception intensity of a signal in the radio communication between each weight tag and the tag reader; a data discrimination portion which discriminates the identification data corresponding to each weight tag into first identification data indicating that a reception intensity indicated by reception intensity data corresponding to the identification data exceeds a reference intensity set in advance for determining whether each weight is attached to the main body portion or not and other second identification data; and an attachment determination portion which determines an attachment state of each weight to the main body portion based on the first identification data only.

According to this configuration, the tag reader provided in the main body portion acquires identification data corresponding to each weight tag from a weight tag mounted on each weight. The data processing device acquires identification data and reception intensity data corresponding to each weight tag from the tag reader. The reception intensity data indicates a reception intensity of a signal in radio communication between each weight tag and the tag reader. Each identification data acquired by the tag reader is discriminated into the first identification data indicating that a reception intensity exceeds a reference intensity and other second identification data. An attachment state of each weight to the main body portion is determined based on the discriminated first identification data only. Accordingly, even when a weight yet to be attached is present at a work site, an attachment state of a weight can be automatically and correctly determined.

Preferably in the above crane, the reception intensity data is data which is transmitted from each weight tag to the tag reader together with the identification data and which is generated by detecting an intensity of a reception signal by each weight tag, the reception signal being received from the tag reader by the radio communication.

According to this configuration, the tag reader is allowed to receive reception intensity data indicative of a reception intensity detected by each weight tag as well as receiving identification data transmitted from each weight tag.

Preferably in the above crane, the tag reader further includes a reception intensity detection portion which detects a reception intensity indicative of an intensity of a signal transmitted from each weight tag by the radio communication, and the data acquisition portion acquires data indicative of a reception intensity detected by the reception intensity detection portion as the reception intensity data.

According to this configuration, the tag reader is allowed to detect a reception intensity corresponding to each weight tag from a signal transmitted from each weight tag.

Preferably, the above crane further includes a main body tag as an electronic tag which is provided in the main body portion and in which specific identification data is recorded in advance, in which the tag reader further executes processing of acquiring the specific identification data and reception intensity data corresponding to the main body tag from the main body tag by the radio communication, the data acquisition portion further acquires the specific identification data and the reception intensity data corresponding to the main body tag from the tag reader, and the data processing device further includes a first reference setting portion which sets the reference intensity with the reception intensity corresponding to the specific identification data as a reference.

According to this configuration, specific identification data and reception intensity data are acquired by the tag reader from the main body tag provided in the main body portion. A reference intensity is set with a reception intensity indicated by the reception intensity data transmitted from the main body tag as a reference. Therefore, a reference intensity taking into consideration a communication environment at a work site largely varying with weather can be set by simple processing.

Preferably, the above crane further includes a main body tag as an electronic tag which is provided in the main body portion and in which specific identification data is recorded in advance, in which the tag reader further executes processing of reading the specific identification data from the main body tag by the radio communication and processing of detecting the reception intensity corresponding to the main body tag, the data acquisition portion further acquires the specific identification data and reception intensity data indicative of a detected reception intensity corresponding to the main body tag from the tag reader, and the data processing device further includes a first reference setting portion which sets the reference intensity with a reception intensity indicated by the reception intensity data corresponding to the specific identification data as a reference.

According to this configuration, when specific identification data is read by the tag reader from the main body tag provided in the main body portion, a reception intensity corresponding to the main body tag is detected by the tag reader. A reference intensity is set with the reception intensity indicated by reception intensity data detected by the tag reader as a reference. Therefore, a reference intensity taking into consideration a communication environment at a work site largely varying with weather can be set by simple processing.

Preferably in the above crane, the data processing device further includes a second reference setting portion which sets, among the acquired reception intensities corresponding to the respective weight tags, the reference intensity with the reception intensity as a reference, the reception intensity being corresponding to a weight tag on which the identification data coincident with specific identification data determined in advance is recorded.

According to this configuration, a reference intensity is set with, as a reference, a reception intensity corresponding to a weight tag on which the identification data coincident with specific identification data determined in advance is recorded. Therefore, a reference intensity taking into consideration a communication environment at a work site largely varying with weather can be set by simple processing without providing an electronic tag in the main body portion.

Preferably in the above crane, the data processing device further includes a notification portion which notifies information indicative of a determination result of an attachment state of each weight.

According to this configuration, an operator of a crane or the like can be notified of an attachment state of a weight to the crane.

Preferably in the above crane, the notification portion further notifies information about the second identification data.

According to this configuration, for example, an operator of a crane or the like can be notified of information about an attachment state of a non-attached weight around the crane.

Preferably in the above crane, the attachment determination portion determines a weight of the weight attached to the main body portion based on the number of the first identification data and a known weight of the single weight.

According to this configuration, a weight of the weight attached to the crane can be calculated.

Preferably in the above crane, the plurality of weights include one or more counter weights detachably attached to the upper slewing body.

According to this configuration, even when a non-attached counter weight is present at a work site, an attachment state of a counter weight can be automatically and correctly determined.

Preferably in the above crane, the plurality of weights further include one or more body weights detachably attached to the lower travelling body.

Attachment/non-attachment of the body weight can be determined.

This application is based on Japanese Patent application No. 2019-118852 filed in Japan Patent Office on Jun. 26, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A crane comprising:
   a main body portion which includes a lower travelling body and an upper slewing body turnably provided on the lower travelling body and to which a plurality of weights can be attached;
   a tag reader which is provided in the main body portion and acquires, from a weight tag mounted on each weight, identification data corresponding to each weight tag by radio communication; and
   a data processing device which acquires data from the tag reader,
   wherein the data processing device includes:
     a data acquisition portion which acquires the identification data and reception intensity data corresponding to each weight tag from the tag reader, the reception intensity data being indicative of a reception intensity of a signal in the radio communication between each weight tag and the tag reader;
     a data discrimination portion which discriminates the identification data corresponding to each weight tag into first identification data indicating that a reception intensity indicated by reception intensity data corresponding to the identification data exceeds a reference intensity set in advance for determining whether each weight is attached to the main body portion or not and other second identification data; and
     an attachment determination portion which determines an attachment state of each weight to the main body portion based on the first identification data only.

2. The crane according to claim 1, wherein the reception intensity data is data which is transmitted from each weight tag to the tag reader together with the identification data and which is generated by detecting an intensity of a reception signal by each weight tag, the reception signal being received from the tag reader by the radio communication.

3. The crane according to claim 1, wherein
the tag reader further includes a reception intensity detection portion which detects a reception intensity indicative of an intensity of a signal transmitted from each weight tag by the radio communication, and
the data acquisition portion acquires data indicative of a reception intensity detected by the reception intensity detection portion as the reception intensity data.

4. The crane according to claim 3, further comprising:
a main body tag as an electronic tag which is provided in the main body portion and in which specific identification data is recorded in advance, wherein
the tag reader further executes processing of reading the specific identification data from the main body tag by the radio communication and processing of detecting a reception intensity corresponding to the main body tag,
the data acquisition portion further acquires the specific identification data and reception intensity data indicative of a detected reception intensity corresponding to the main body tag from the tag reader, and
the data processing device further includes a first reference setting portion which sets the reference intensity with a reception intensity indicated by the reception intensity data corresponding to the specific identification data as a reference.

5. The crane according to claim 1, further comprising:
a main body tag as an electronic tag which is provided in the main body portion and in which specific identification data is recorded in advance, wherein
the tag reader further executes processing of acquiring the specific identification data and reception intensity data corresponding to the main body tag from the main body tag by the radio communication,
the data acquisition portion further acquires the specific identification data and the reception intensity data corresponding to the main body tag from the tag reader, and
the data processing device further includes a first reference setting portion which sets the reference intensity with a reception intensity indicated by the reception intensity data corresponding to the specific identification data as a reference.

6. The crane according to claim 1, wherein
the data processing device further includes a second reference setting portion which sets, among the acquired reception intensities corresponding to the respective weight tags, the reference intensity with the reception intensity as a reference, the reception intensity being corresponding to a weight tag on which the identification data coincident with specific identification data determined in advance is recorded.

7. The crane according to claim 1, wherein
the data processing device further includes a notification portion which notifies information indicative of a determination result of an attachment state of each weight.

8. The crane according to claim 7, wherein
the notification portion further notifies information about the second identification data.

9. The crane according to claim 1, wherein
the attachment determination portion determines a weight of the weight attached to the main body portion based on the number of the first identification data and a known weight of the single weight.

10. The crane according to claim 1, wherein
the plurality of weights include one or more counter weights detachably attached to the upper slewing body.

11. The crane according to claim 10, wherein
the plurality of weights include one or more body weights detachably attached to the lower travelling body.

12. The crane according to claim 1, wherein the data processing device is configured to determine automatically the attachment state of each weight even when a weight yet to be attached is present at a work site.

13. A method for determining a weight state in a crane, the crane including a main body portion which includes a lower travelling body and an upper slewing body turnably provided on the lower travelling body and to which a plurality of weights can be attached; a tag reader which is provided in the main body portion and acquires, from a weight tag mounted on each weight, identification data corresponding to each weight tag by radio communication; and a data processing device which acquires data from the tag reader, the method comprising:
the step of executing processing, by the tag reader, of acquiring the identification data and reception intensity data from each weight tag by the radio communication, the reception intensity data being indicative of a reception intensity of a signal in the radio communication between each weight tag and the tag reader;
the step of acquiring the identification data and the reception intensity data corresponding to each weight tag from the tag reader by the data processing device;
the step of discriminating, by the data processing device, the identification data corresponding to each weight tag into first identification data indicating that a reception intensity indicated by reception intensity data corresponding to the identification data exceeds a reference intensity set in advance for determining whether each weight is attached to the main body portion or not and other second identification data; and
the step of determining an attachment state of each weight to the main body portion based on the first identification data only by the data processing device.

* * * * *